April 29, 1930.  J. BIJUR  1,756,335
TRUNNION JOINT AND THE LUBRICATION THEREOF AND OF ASSOCIATED PARTS
Original Filed June 19, 1924  6 Sheets-Sheet 1

INVENTOR
Joseph Bijur
BY his ATTORNEYS

April 29, 1930.  J. BIJUR  1,756,335
TRUNNION JOINT AND THE LUBRICATION THEREOF AND OF ASSOCIATED PARTS
Original Filed June 19, 1924   6 Sheets-Sheet 2

INVENTOR
Joseph Bijur
BY
Dean, Fairbank, Obright & Hirsch
his ATTORNEYS

April 29, 1930.   J. BIJUR   1,756,335
TRUNNION JOINT AND THE LUBRICATION THEREOF AND OF ASSOCIATED PARTS
Original Filed June 19, 1924   6 Sheets-Sheet 3

INVENTOR
Joseph Bijur
BY
Dean, Fairbank, Obright & Hirsch.
his ATTORNEYS

April 29, 1930.   J. BIJUR   1,756,335
TRUNNION JOINT AND THE LUBRICATION THEREOF AND OF ASSOCIATED PARTS
Original Filed June 19, 1924   6 Sheets-Sheet 5

INVENTOR
Joseph Bijur
BY
Dean, Fairbank, Obright & Hirsch.
his ATTORNEYS

Patented Apr. 29, 1930

1,756,335

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

TRUNNION JOINT AND THE LUBRICATION THEREOF AND OF ASSOCIATED PARTS

Application filed June 19, 1924, Serial No. 720,927. Renewed September 12, 1929.

My present invention relates to lubrication and is shown embodied in the propeller shaft assembly of a motor vehicle power transmission, to effect the lubrication of some or all of the various bearings of the forward and rear universal, and slide joint bearings of such assembly, the invention having, however, a broader field of application to the lubrication of transmission elements and assemblies in power trains for other uses.

The trunnion bearings of universal joints revolve in operation together with their mounting appliances and, in general, with other associated structure, and accordingly, do not present as do joints or bearings of other types, any stationary mount for direct application of a source of lubricant or of the outlet end of a lubricant supply pipe.

It is among the objects of the invention to effect adequate lubrication of universal joints with substantially the same facility of operation as in the lubrication of ordinary bearings that have stationary bearing boxes, and more specifically to effect such lubrication without the need for opening or removing any closure of the joint, or for any manual access to the joint, and without even the need for stopping the revolution of the joint while applying lubricant.

The results enumerated are accomplished by my invention with only minor modification from approved standard constructions of universal joints, without the need for revolving inlets, oil or grease cups, or projecting or exposed pipes or conduits, and without exposing the lubricant either during or after admission to dirt, dust or water.

Among other objects are to provide a construction of the character set forth, in which the operation of the transmission train including the universal joint will not exert any strain or stress upon the lubricant supply appurtenances, and in which the lubricant may be delivered to the joint simultaneously with the lubrication of other bearings from a single source or point of control.

Another object is to provide simple means functioning automatically and reliably to supply with lubricant derived from a universal joint, one or more other bearings, as for instance, either or both the slide joints near the forward universal of a propeller shaft assembly and the rear universal joint thereof, while assuring an adequate residue of lubricant at the forward universal.

Among other objects are to lubricate the forward universal joint of the propeller shaft of a motor vehicle with oil from an external source without admitting any of said oil into the transmission case and to deliver into the universal joint such lubricant as might otherwise become lost from the transmission case.

Another object is to provide a rear universal joint for the propeller shaft of a motor vehicle, which though effectively retaining the lubricant and substantially proof against the entry of dirt, dust or water thereto, will yet permit ready access to the differential take-up collar without the need for prior disassembly or other manipulation.

The invention is carried into execution by providing the revolving universal joint structure with means for intercepting lubricant delivered thereto through a non-revolving inlet apart therefrom. The intercepting means is in communication with the bearing surfaces in the universal joint and preferably through one or more outwardly diverging passages through which, during revolution, the lubricant, accordingly, advances by centrifugal force toward the joint bearings. The diverging passages may be bores in the clevis terminal or forging of the universal joint either communicating direct with the intercepting means and independently of the shaft to which the universal joint is connected, or if desired, communicating with the surface or end of said shaft, in which event, special cap or closure means is provided on the terminal sleeve of the universal joint to prevent leak of the lubricant from beyond the end of said shaft.

The preferred intercepting means comprises an annular trough carried by the driving forging of the universal joint and supplied from the inlet, which latter is preferably in a fixed collar about the terminal sleeve of the universal joint. The ducts may extend through the outer periphery of the trough, through which the lubricant would accordingly be ejected directly into the joint, or, if desired, the trough may be closed at its outer periphery and the lubricant passing from the trough after the universal joint has come to rest or substantially to rest, may be subsequently delivered to the bearings of the universal joint through the passage or passages in the forging.

While the lubricant may be arranged to drip into the annular trough past an air gap, it is preferred to provide packing between the stationary collar and the rotating trough to prevent the entry of dirt, dust or water into the course of lubricant flow.

The trough has a wall extending radially inward at the side away from the trunnion bearings, so that any lubricant delivered to the trough will tend by gravity or centrifugal force to pass into the universal joint rather than to the floor or road.

According to one general mode of executing the invention as applied to the propeller shaft assembly, the front universal joint and the rear universal joint thereof may each be supplied through separate inlet arrangements of the character referred to.

According to another feature of the invention, the slide shaft associated with the forward universal joint of the propeller shaft assembly is lubricated from said joint by oblique ducts, preferably bores through or grooves in the driven clevis or forging. When the joint comes to rest with one of said ducts or grooves sloping downward toward the slide shaft, such lubricant only as may be intercepted in said duct or groove, drains to the slide shaft, the terminal sleeve of which is sealed beyond the end of the slide shaft to prevent loss of lubricant therefrom or entry of dust thereto.

In the application to propeller shafts of automotive vehicles, it is preferred to deliver from the transmission case to the forward universal joint, such small quantities of lubricant as would ordinarily leak from the transmission case to the road. For this purpose, such lubricant is intercepted in an annular trough carried by the universal joint, and communicating with the bearing of the joint through appropriate ducts.

While lubricant thus passing from the transmission case to the forward universal joint will alone assist in lubricating the latter, and while, of course, lubricant supplied from the external source at the stationary collar would suffice for all purposes, it is preferred to deliver to the universal joint in addition to the lubricant from the external source, any leak from the transmission case. In this combined arrangement, a single annular trough and the connecting ducts therefor suffice to intercept and deliver the lubricant from the inlet and from the transmission case, or other lubricated mechanism.

According to another embodiment, the propeller shaft connecting the universal joints, serves as a conduit feeding lubricant to the rear of said members, preferably from that at the forward end. For this purpose, a bore or other oil conveying means may extend axially through the forward splined head of the propeller shaft and thence through the length of the propeller shaft. By reason of the axial arrangement of the bore in the propeller shaft head, the forward universal will not be depleted of oil, since only lubricant above the level of said bore, or lubricant splashed to said level and entering said bore will pass on to the rear or lower universal joint. I may, for this purpose, provide a wick in the axial bore of the splined head, protruding somewhat in front thereof, or a plunger longitudinally grooved and protruding from the bore and feeding thereinto, said plunger preferably spring-pressed so as to adapt itself to relative displacement of the parts in operation.

In another embodiment, lubricant intercepted by a part of the forward universal that may stop above the level of the propeller shaft is conveyed by gravity flow through an appropriate passage to the propeller shaft through which it then flows onward to the rear universal.

In my copending application Serial No. 18,092, filed March 25, 1925, is claimed the generic matter which that case discloses in common with the present case.

In the accompanying drawings in which are shown one or more of various possible embodiments of the several features of this invention, Fig. 1 is a view in longitudinal cross-section of a propeller shaft assembly lubricated according to my invention, Fig. 1ª is a fragmentary view of a modification, Fig. 2 is a transverse sectional view taken on a larger scale of a detail of Fig. 1, Fig. 3 is a transverse sectional view taken along the line 3—3 of Fig. 2, Fig. 15 is a view similar to Fig. 9, indicating the lubrication of a further alternative form of universal joint, Fig. 16 is a transverse sectional view taken along the line 16—16 of Fig. 15, Fig. 17 is a fragmentary sectional view, indicating the construction for lubricating the slide bearing from the universal joint, Fig. 17$^a$ is a detail sectional view taken along the line 17$^a$—17$^a$ of Fig. 16, Fig. 18 is a fragmentary sectional view indicating an alternative construction for lubricating a universal joint of the type shown in Fig. 15, and Fig. 19 is a view in transverse cross-section taken along the line 19—19 of Fig. 18.

Figures 1, 1A, 2, 3:
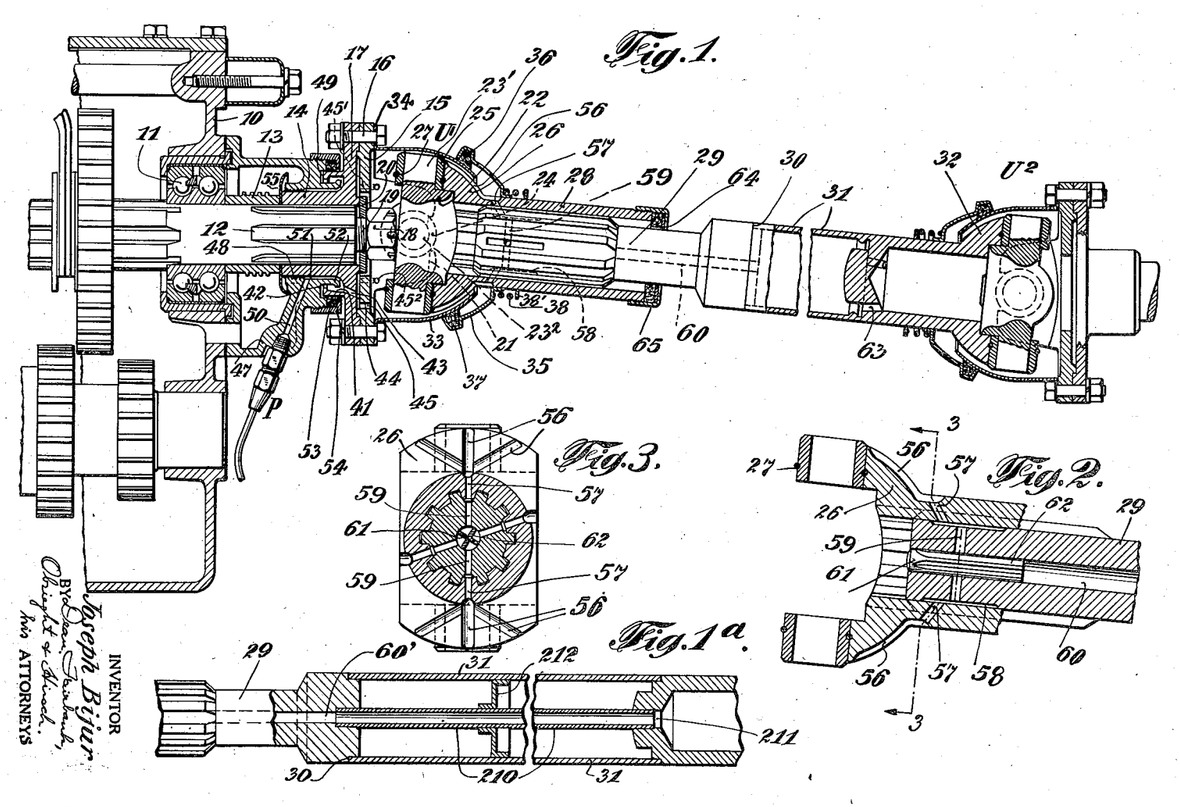

Referring now to Figs. 1 to 3 of the drawings, I have shown in general outline, a fragment of the gear or transmission case 10 of a motor vehicle having a ball bearing 11 in the rear end thereof for the protruding shaft 12 upon which is illustratively shown a worm sleeve 13 for driving a speedometer (not shown). The terminal sleeve 14 for the forward universal joint U' is splined to shaft 12, as shown.

The general construction of universal joint in this embodiment is of familiar type and comprises an annular mounting or base plate 15 bolted as at 16 to the flange 17 of the mounting terminal, the latter secured against coming off the shaft by a nut 18, threaded, and preferably locked upon the end of the shaft projection 19 against a metal washer 20 which coacts with the end of sleeve 14. The mounting flange has diametrically opposite yokes 21 for a trunnion ring 22 provided with four bearing lugs at intervals of a quadrant, one pair of diametrically opposite lugs 23$^2$ bearing in bushings 24 positioned in the yokes 21, the other pair of bearing lugs 23' extending into bushings 25 in a corresponding yoke 26 of the driven forging.

The bushings 24 and 25 are of diameter larger than the open length between the arms of yokes 21 and 26, which length, in turn, exceeds the diameter of studs 23, so that in assembly, the bearing lugs 23$^2$ of the trunnion ring are inserted between the arms of the yoke 21 by movement toward the base plate, whereupon the bushings are inserted over the ends of the bearing studs and locked in place by lock rings 27, fitting in corresponding peripheral grooves about the bushings, and the bearing studs 23' are then similarly assembled with respect to the driven forging 26. The driven forging 26 is formed integral with a terminal sleeve 28 that has a splined or driving connection with the correspondingly splined shaft head 29 welded as at 30 to the end of the tubular propeller shaft 31, the opposite end of which is similarly welded to a similar forging 32 serving as the driver of the rear universal joint U$^2$, the detailed construction of the latter being generally similar to that of the forward universal. A generally spherical sheet metal shell 33 about the joint U' has a flange 34 secured in place against the base plate 15 of the universal by the bolts 16, and coacts at its open end with a complementary spherical segment shell member 35 having an annular packing felt 36 retained in a corresponding annular depression 37. A coil spring 38 encircling the terminal 28 and reacting against stop flange 38' presses packing 36 into coaction with the shell 33.

Lubricant within the spherical shell 33 would be whirled about therein in operation of the universal, to lubricate the bearings thereof, and some of said lubricant would pass onward to lubricate the slide joint of terminal sleeve 28. Centrifugal force upon the lubricant occurring in operation, would tend, particularly when the universal is filled or packed tight, to eject some of the lubricant past the packing 36. To prevent splashing of the vehicle with such lubricant, it is preferred to provide a sheet metal guard (not shown) which may be bolted by a bracket (not shown) either to the rear part of the gear box or to some other non-revolving structure member, said guard taking the splash and preventing soiling of the underneath part of the vehicle.

According to my invention, the familiar construction set forth is modified to render possible the supply of lubricant thereto from the exterior, without the need for disassembly of the universal and without inconvenience of any sort, such as even the need for manual access at the universal.

For this purpose, the terminal flange 17 is formed at its exterior side with lubricant intercepting means, preferably in the form of a coaxial annular trough with its concavity at the inner periphery thereof. This may comprise an integral generally cylindrical flanged trough 41 extending about the terminal sleeve, having an annular rim or enlargement 42 at its free edge protruding radially inward from the inner periphery thereof. A plurality of oblique ducts 43 diverging outward from the shaft are bored through the terminal flange to deliver to the flat annular space 44 determined between the terminal flange and the base plate 15 which, in turn, drains through a plurality of bores 45 in the base plate, that deliver to the interior of the lubricant retaining shell 33 of the universal joint. It is preferred to employ about eight of the bores 45 at equal angular intervals, those in the region of yoke 21 extending partly through the yokes as at 45' and delivering to the interior of the shell, each through a transverse outlet bore $45^2$.

It will be understood that lubricant could be delivered to the trough 41 by any appropriate means either while the universal is stationary or while it is operating. In the former case, such lubricant would drain by gravity flow into the universal; in the latter case the lubricant would be thrown by centrifugal force outward through the oblique ducts 43 for entry to the universal through the bores 45 and 45'.

A preferred construction for delivering lubricant to the annular trough comprises an appropriate stationary lubricant inlet fitting P in the collar 47, which encircles terminal sleeve 14 and which is secured to the rear of the transmission case. The collar has the usual grooves 48 which tend to prevent escape therebeyond of lubricant leaking from the transmission case 10 and which may pass the baffle plate 55. An annular groove 49 in the end of collar 47 accommodates the trough 41. The inlet fitting delivers through a bore 50 in the collar to an annular space 51 between the collar 47 and the terminal sleeve 14, which ends in a lip 52 that drains to the trough 41 and preferably near the forward or draining edge of said trough. It will be seen that lubricant admitted through the bore 50 and passing from space 51 into the annular trough 41 will readily drop by gravity, should the joint not be spinning at the time through the oblique bore or bores 43 at the time sloping downward into the universal joint. On the other hand, if the lubricant is applied while the universal joint is spinning, such lubricant will be propelled by centrifugal force through the various diverging bores 43 into the universal joint. The annular base of the trough is preferably inclined outward as shown, to promote the travel of the lubricant from the trough to the joint by gravity, when the joint is not in operation, and by centrifugal force when it is spinning. Moreover, the annular bead or rim 42 at the rear edge of the trough prevents the ready escape either by gravity flow or centrifugal force in direction other than to the shell 33, of lubricant from the annular trough.

In the preferred embodiment, an annular felt packing 53 encircles the trough member 41 and is pressed by a screw cap 54 threaded upon the collar 47 into tight engagement therewith, said packing serving to exclude dirt, dust or water from the path of the lubricant, and further aiding in preventing possible escape of lubricant from the trough to the road.

It may here be noted that oil or other lubricant from the transmission case has a tendency to escape from the usual packing gland at the rear end thereof, even where, as shown in the drawings, the baffle plate 55 is provided between the case and the packing, and the collar 47 closely encircles the universal joint terminal sleeve 14. By the construction described, it will be seen that any such lubricant from the transmission case passing the baffle plate 55 and the grooves 48 is intercepted by the annular trough 41 before it can reach the packing 53 and when once it has reached the annular trough, it is readily conveyed through the ducts 43 into the universal joint in the manner previously described.

It will be understood, of course, that such lubricant as is delivered from the transmission case alone is desirable in lubricating the universal joint, but in the absence of special regulating precautions, may be insufficient for the purpose, or if the escape of lubricant from the case is facilitated, said case may be robbed of lubricant which it requires for proper functioning. By my invention, lubricant is reliably supplied in desired quantities to the universal joint through the fitting P, and such lubricant as does escape from the transmission case instead of being allowed to go to waste, is also admitted to the universal joint.

In the embodiment shown, lubricant is conveyed from the forward universal joint through the length of the propeller shaft to supply the rear universal joint $U^2$. To this end, it is important that too much of the lubricant be not drained from the forward universal. In the embodiment shown, the driven forging 26 which is hemispherical or cup-shaped at its exterior, preferably is provided with generally longitudinal grooves 56, which will intercept lubricant during operation. Preferably the grooves are in four groups, the grooves of each group converging and merging at their lower ends, so that at least one of the grooves will extend above the shaft and will slope downward at a substantial angle, regardless in what angular relation the universal has come to rest, part or all of the lubricant from such groove flowing downward by gravity to the splined shaft 29 and thence rearward to the rear universal.

For the latter purpose, the inner end of each of the groups of grooves 56 is connected by an oblique bore 57 through terminal sleeve 28 to the splined shaft 29, the splines corresponding to said radial bores being each formed with a short well or depression 58 for intercepting such lubricant and, in turn, draining through corresponding bores 59 radial of the splined shaft into an axial bore 60 through the splined head 29. To prevent lubricant which may have drained through one of the radial bores from returning by forward flow to the universal joint, the forward end of the bore 60 is closed by a metal plug 61, fully sealing the forward end thereof, and having a shank fluted as at 62 to provide grooves, one corresponding to each of the radial bores, so that the lubricant which has dripped from the bores will flow along the corresponding fluting and drop into the longitudinal bore 60 and thence flow by gravity downward through the length of the propeller shaft, the rear head 32 of the latter being formed with a plurality of bores 63 through one or more of which the lubricant will pass, on its way to the rear universal joint.

It will be seen that part of the lubricant on its way from the forward to the rear universal joint, and some of the splash in shell 33 will be intercepted by the bearing surface of splined shaft 29 to lubricate the latter. Escape of any lubricant rearward from the splined shaft is prevented by the usual packing gland 64 encircling the propeller shaft and forced against the end of the sleeve 28 by a cap 65 threaded over said sleeve.

In Fig. 1ª, I have shown a pipe 210 extending lengthwise and axially of the propeller shaft, extending at its forward end into bore 60' of the splined head, and at its rear end a similar bore 211 in the rear head, said pipe being sustained between its ends by collars 212 thereabout, press-fitted into the shaft. The pipe may be secured by any appropriate means against shifting longitudinally of the shaft, and serves to convey the lubricant from the forward directly to the rear universal, out of contact with the much larger surface area of the propeller shaft.

Figure 4:
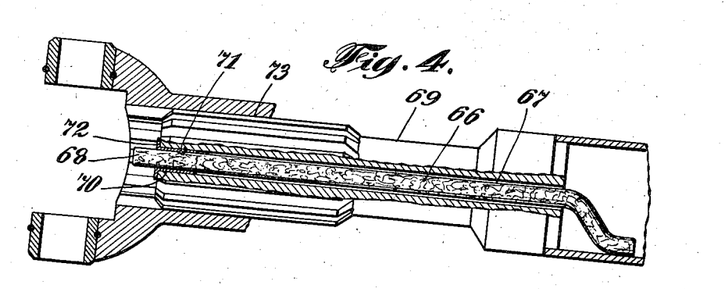
Fig. 4 is a fragmentary view in longitudinal section through the propeller shaft indicating one manner of directing lubricant longitudinally thereof.

In Fig. 4 is shown a modification of that part of the construction, by which the lubricant is delivered from the forward to the rear universal. In this embodiment, I have shown a wick 66 extending axially through the bore 67 in the splined head of the propeller shaft and protruding as at 68 into the universal joint at its forward end and drooping to the bottom of the hollow propeller shaft at the rear end. A sheet metal ferrule 70 encircles the forward end of the wick and has inbent prongs 71 to hold the wick, said ferrule, in turn, retained by flange 72 thereof, against the end of the splined shaft. The ferrule thus holds the wick against longitudinal displacement and also affords a small space between the wick and the bore which prevents undue compression or jamming of the wick into the bore in which it is enclosed.

It will be understood that if the height of lubricant in the universal joint reaches the wick, lubricant will be drawn by capillary action through the wick and deposited in the propeller shaft, whence it flows onward by gravity to the rear universal, until the level of the lubricant in the forward universal is below that of the wick. It will also be seen that in operation of the transmission train, lubricant even though at low level in the forward universal, would splash about and wet the end of the wick 66 and be thereby fed rearward to supply the rear universal joint. In the reciprocating action of the slide bearing 73, some of the lubricant in the universal will work its way along the bearing surface to lubricate the same.

Figure 5:
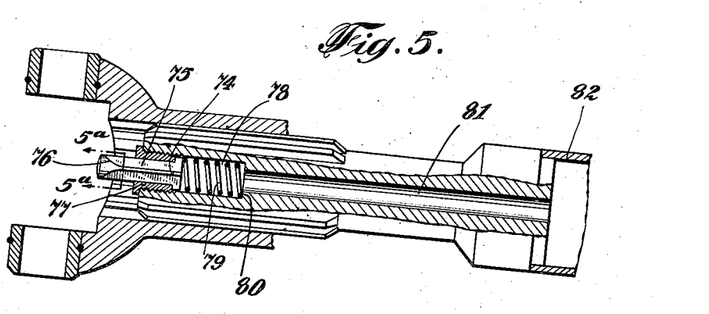
Fig. 5 is a view similar to Fig. 4 of a modification, Fig. 5ª is a detail sectional view taken along the line 5ª—5ª of Fig. 5.
Figure 5A:
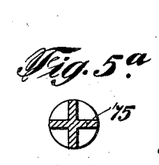

In Fig. 5 is shown another modification, which includes a small axial plunger 74 having longitudinal flutings 75 milled thereinto and accordingly tapered as at 76 near the forward end of the plunger. The plunger preferably slides in a collar 77 threaded into enlarged bore 78 in the end of the spline shaft. A coil spring 79 reacts against shoulder 80 between enlarged bore 78 and the main length of bore 81 in the propeller shaft 82 and urges the plunger 74 outward.

In this embodiment, it will be seen that if the lubricant in the forward universal joint is above the level of the plug, excess will drain by gravity flow through the plug and onward to the rear universal. In the splash occurring in normal operation, even with lubricant at low level, some will be intercepted by the upper of the flutings and pass onward by gravity to the rear universal joint. In the slide operation of propeller shaft 82, the plunger 74 may contact the end of shaft 12, the spring 79 then yielding to permit a telescoping action thereof, and returning the plunger to the outermost position shown, as the shaft again slides away from the transmission case.

Figure 6:
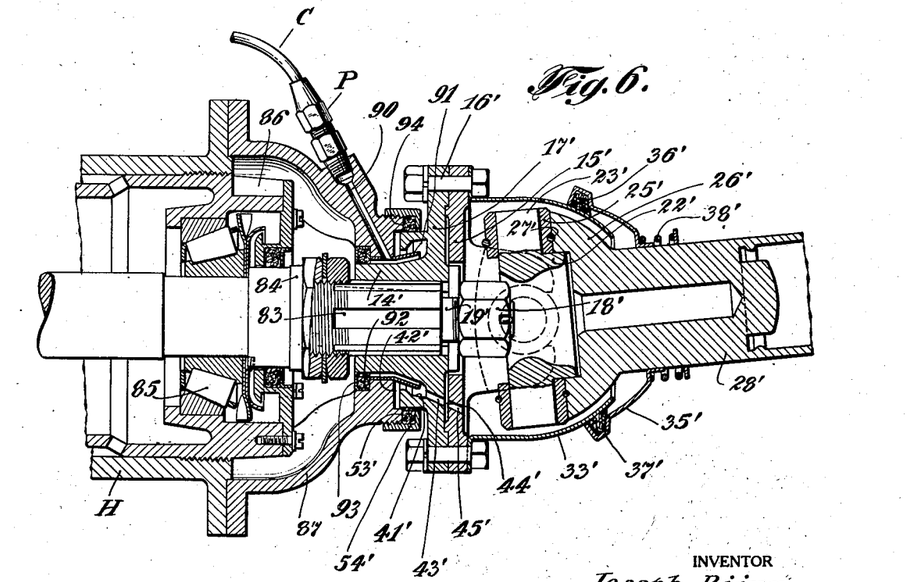
Fig. 6 is a view in longitudinal cross-section of an alternative embodiment, indicating the lubrication of the rear universal joint.
Figure 7:
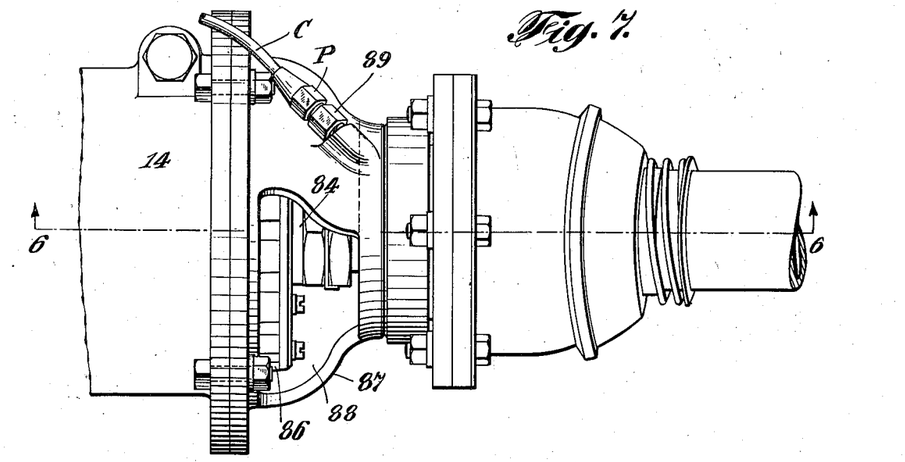
Fig. 7 is a plan view of the construction shown in Fig. 6.

In Figs. 6 and 7 is shown an alternative embodiment, whereby the rear universal joint is lubricated directly in manner generally similar to the lubrication heretofore described of the forward universal joint, the propeller shaft not being used as a lubricant conduit between the joints. The universal joint construction at the rear end need not be fully described, as it has a number of elements substantially identical with those at the forward end, corresponding reference numerals representing corresponding parts, primed, however. It is understood, of course, that in this case, the mounting terminal sleeve 14' is the driven rather than the driving element. The splined shaft 83 upon which the terminal sleeve 14' is supported, is an integral extension of the driving bevel pinion shaft 84 of the differential gear. In this construction, the roller bearing assembly 85 for the driving pinion shaft is threaded into the differential housing H and has exposed spanner gripping conformations 86 by which the bearing can be advanced inward to compensate for wear between the pinion and the coacting gear driven therefrom.

The annular trough 41' is an integral part of the mounting flange 17' of the terminal and serves to intercept the lubricant on its way to the universal. The base plate 15' of the universal is bolted at 16' to the mounting flange, and ducts 43' and 45' as in Fig. 1, afford passage from the annular trough 41' to the interior of the universal. The trough 41' is supplied with lubricant through a stationary head or collar 87 bolted to the differential housing, tapered inward and encircling the terminal sleeve, said head being of open or spider construction cut-away as at 88 so as not to interfere with the application of a wrench or other tool, for effecting the differential adjustment previously noted. A lubricant inlet fitting P in head 87 delivers through a bore 90 in the manner heretofore described, to the outer surface of the terminal sleeve 14', whence the lubricant passes onward along a flaring guide sleeve 91 press-fitted into the mouth of the spider head and extending with small clearance about the similarly tapered terminal sleeve.

To maintain the construction dust-tight, a packing washer 92 held by an appropriate metal backing 93 is forced into a corresponding countersink at the rear or inner end of the head and a similar packing 53' encircling the trough 41' is pressed against an upstanding rim 94 on the head and is secured in position by a threaded cap 54'. It will be seen that lubricant admitted through fitting P will pass through bore 90 and through guide sleeve 91 into the annular space around sleeve 14' and by centrifugal force, assuming the joint in operation at the time, or spinning, outward therefrom along sleeve 91 and into trough 41', from which it escapes through the oblique bores 43' and 45' by centrifugal force to the universal joint. In the present embodiment, I have illustratively shown a desirable arrangement of bores 45' through base plate 15' as oblique and in alignment with the corresponding oblique bores 43' in the mounting flange 17'. Either of the alternative arrangements of bores shown in Figs. 1 and 6 may be used in each of said applications.

Should the lubricant be applied through inlet P, while the structure is stationary, it will be understood that such lubricant would pass by gravity flow around the guide sleeve 91 to the lowermost part thereof, into the trough 41' and thence through the lower duct or ducts 43' into the universal joint. It will be seen that in this application, the lubricant in differential housing H cannot become mixed with that admitted through fitting P.

The inlet fitting P in any of the embodiments shown, may be an oil cup or grease cup which, since it is at a stationary part of the structure does not provide any unbalanced stresses that would ensue were such elements mounted on the rapidly revolving universal joint.

The lubricant can be supplied to the universal joint or joints alone, or simultaneously to said joints and to other bearings, either continuously or intermittently, automatically or by manual control. In the preferred embodiment, the lubricant is passed through a fitting P threaded into a corresponding socket in the inlet and supplied from a pipe C, so that the universal can be lubricated by direct operation at the dash or at some other conveniently accessible place.

Figure 8:
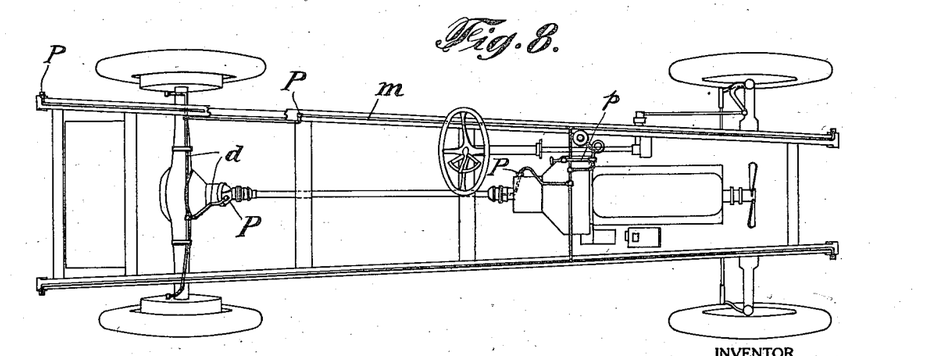
Fig. 8 is a diagrammatic view indicating one mode in which my invention can be applied in an installation providing for the lubrication of a multiplicity of bearings.

Fig. 8 illustratively shows an installation comprising a lubricant pressure source $p$, mains $m$ supplied therefrom and communicating through outlet fittings P with the spring shackles, spring bolts, etc., two of the fittings P being diagrammatically shown, one communicating with each of the universal joints of the propeller shaft assembly, preferably by the construction indicated in Figs. 1 and 6. Each of the fittings would preferably be of flow-controlling type, so that a single operation of the pressure source would result in supply of some predetermined proportion of the lubricant to each of the bearings and universal joints. The branch pipe $d$ preferably extends along the rear axle and about the differential housing structure to deliver to the rear universal in the manner previously described. In the pressure-operated system diagrammatically shown, the fitting P in the universal may be located at any convenient part of the mounting collar therefor, above, below or laterally of the terminal sleeve 14 or 14'. While I prefer to rigidly mount the structure on which inlet fitting P is applied, it will be understood that the structure need merely be retained by some appropriate stop against revolution or substantial angular displacement with the universal joint. Of course, when the rear universal is to be supplied from the front through the propeller shaft, the fitting shown at P in Fig. 8 at the rear universal, would be omitted.

It will be understood that in carrying out my invention in any of the embodiments shown, it would be preferable to charge the universal joint in any manner with lubricant when the new device is about to be put into service, the lubricant which becomes lost during use, being replenished by the arrangement and in the manner previously set forth.

In Figs. 9 to 14 are indicated ways in which my invention can be embodied in connection with a universal joint of type different from that illustratively shown in Figs. 1 to 7. The type of universal joint here disclosed comprises a forging including a terminal sleeve 95 with an integral yoke 96 provided with integral bearing studs 97 extending in diametrically opposite directions outward therefrom. The driven yoke 98 is of similar construction and is provided with studs 99 extending midway between or at right angles to the studs 97. The two yokes are connected in driving relation by an enclosing ring structure formed of two annular trough elements 100, which are connected to the respective studs by bearing bushings 101, one about each of the studs 97 and 99, each provided with a lateral lug 102 extending through apertures 105 in the corresponding lateral face of the ring, the parts maintained in assembled relation by nuts 103 threaded upon the projecting ends of said lugs. Preferably washers 104 are provided at both sides of the apertures 105 through the rings to maintain the lubricant-tight connection and the inner peripheries at the interior of the ring 100 have countersunk gaskets 106, to prevent leak thereat. By this construction, it will be seen that lubricant within the annular enclosure is not ejected or lost when thrown outward by centrifugal force.

Figure 9:
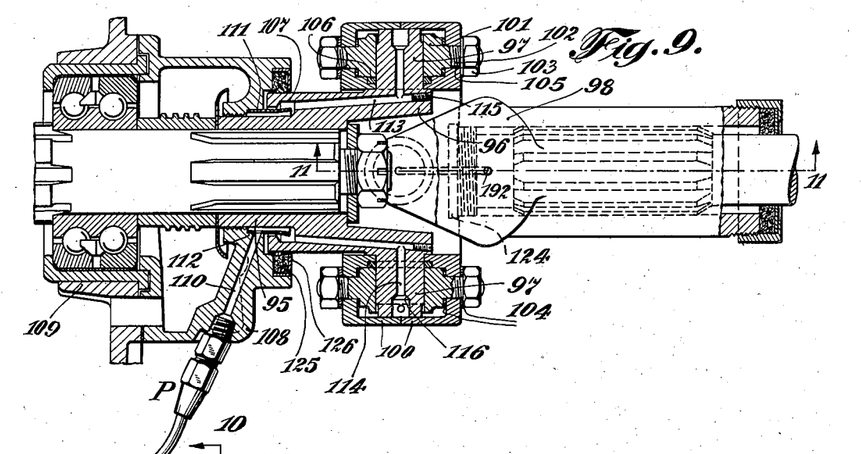
Fig. 9 is a view partly in longitudinal cross-section and partly in elevation, indicating the lubrication of a universal joint of modified type.

In the present embodiment, I have shown an annular trough 107 similar to that shown in Fig. 1 encircling the spline sleeve 95 and formed integral therewith. Lubricant is supplied to said trough from a stationary inlet fitting P applied in a fixed collar 108 shown secured to the transmission case 109 and delivering through a bore 110 in said collar to a sheet metal, generally cylindrical guide 111 fitted in an enlarged socket 112 in the collar and having an edge sloping outward to deliver or drip into the annular trough 107. The annular trough communicates to the interior of the shell through oblique bores 113 through the yoke 96 communicating with axial bores 114 through the studs 97, said bores 113 plugged as at 115 at their outer ends so that lubricant which has passed by centrifugal force through the trough lengthwise outward through the bores will be delivered outward through the axial bores 114 into the annular enclosure 100. The studs 97, 99 preferably bear at their ends against corresponding flats 97', 99' respectively in the ring 100, which prevent rattling or looseness of the parts and, moreover, substantially close the outer ends of bores 114. The lubricant passes to the trunnion bearings through radial bores 114' in the studs, delivering each to a peripheral groove 101' in the outer end of the studs 97—99.

It is preferred to provide an annular packing 125 of felt or the like backed by a metal frame 126 between the collar 108 and the rotating outer surface of the trough 107 in order to prevent the entry of dirt, dust or water into the construction.

Lubricant in excess of that required by bearings 97—101 and thrust face 97' will enter the annular enclosure 100 and will be splashed about the same and be intercepted by similar grooves 102' about the studs 99 of the driven forging to lubricate the trunnion bearings and thrust face 99' of the latter.

Figures 10, 11:
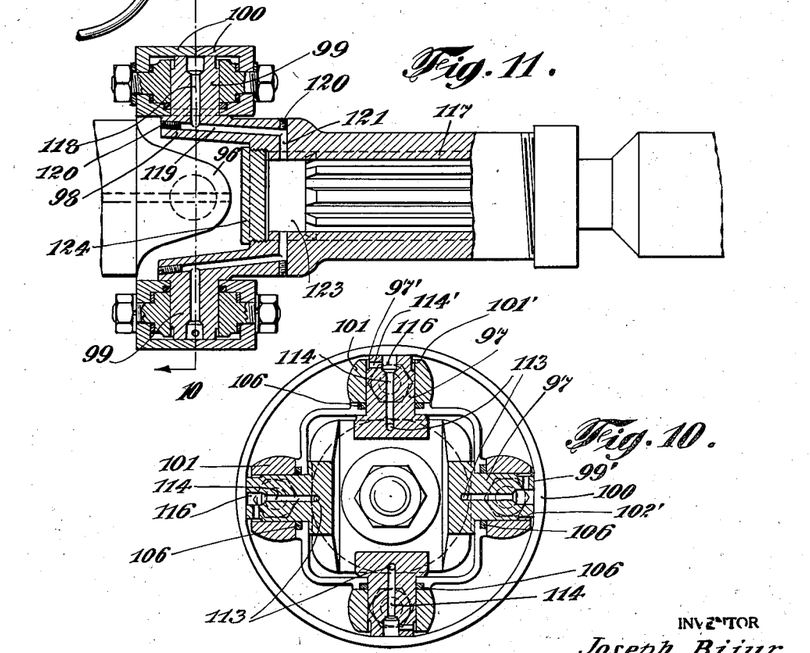
Fig. 10 is a transverse sectional view taken along the line 10—10 of Fig. 11.
Fig. 11 is a fragmentary view of the universal joint and the associated slide bearing.

It is preferred to lubricate the slide joint 117 at the driven end of the universal joint by lubricant derived from the universal joint. For this purpose, the bearing studs 99 on the driven forging 98 are provided with axial bores 118 similar to those at the driving clevis supplied through bores from the groove 102' and communicating with oblique bores 119 in the clevis jaws which communicate at their inner ends with radial bores 121 plugged at their outer ends 120 and delivering to the slide bearing. In the present embodiment, I have shown these radial bores delivering in advance of the free end of the driven shaft to a cavity 123 closed by a screw plug 124 threaded into the inner end of the corresponding terminal sleeve.

The operation of this embodiment is in part obvious and in part apparent from the description of other embodiments. It will be seen that such lubricant as may escape from the transmission case is delivered into the universal joint enclosure by way of the trough 107, as in the embodiment of Fig. 1.

Figure 12:
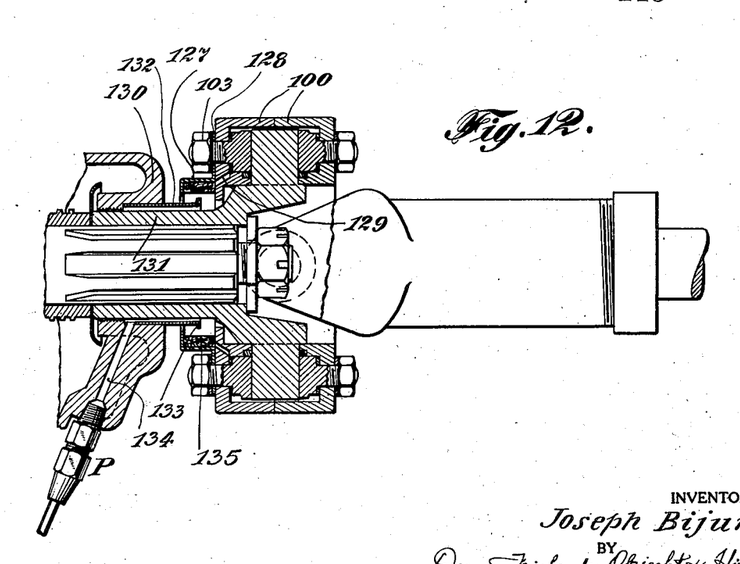
Fig. 12 is a fragmentary view indicating an alternative construction for the lubrication of a universal joint of the type shown in Fig. 9.

In Fig. 12 is shown a fragmentary view of a modification applied to the same type of universal joint shown in Fig. 9, similar parts bearing the same reference numerals as in Fig. 9. In this embodiment, there is mounted on the lateral face of the annular enclosure 100 and preferably at the driving shaft side thereof, a sheet metal trough 127 with its concavity at the inner periphery thereof, and having a mounting flange 128 clamped in position by the nuts 103. With this form of the invention some of the lubricant will seep between the inner trunnion ring flange and the inner sides of the bushings which encircle the trunnion studs, thereby directly reaching the bearing surfaces to be lubricated, while the remainder of the oil will collect in the enclosure formed by the trunnion rings and will lubricate such bearings by wetting their outer ends. The trough 127 drains into the annular enclosure 100 through short outwardly extending bores 129, in the latter. The trough is supplied with lubricant directed thereinto from a stationary collar 130 which encircles the splined terminal sleeve 131 and which carries a cylindrical sheet metal guide sleeve 132 spaced from the sleeve 131 and directed beyond the face of the trough and having an outturned rim 133 past which lubricant that has passed along the sleeve drips into the trough. The sleeve 132 is supplied with lubricant in the manner heretofore described, preferably through a bore 134 in the mounting collar therefor supplied from inlet fitting P. Clearance is provided between the trough 127 and the stationary structure, the packing being preferably omitted, so as to permit the free universal or wobbling movement of the trough with the universal joint enclosure by which it is carried. The trough has a felt ring 135 therein which intercepts the lubricant admitted through the inlet 134, and thus prevents loss through the clearance space, the centrifugal force propelling such lubricant from the felt ring through the ducts 129 into the universal joint. It will be understood, of course, that the lubricant may be conveyed from the universal joint to the slide joint (not shown) in the manner described in connection with Fig. 11.

Figure 13:
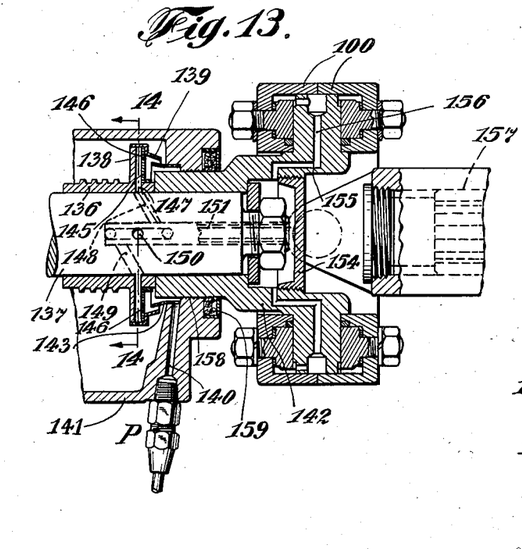
Fig. 13 is a fragmentary view similar to Fig. 12 of a further modification.
Figure 14:
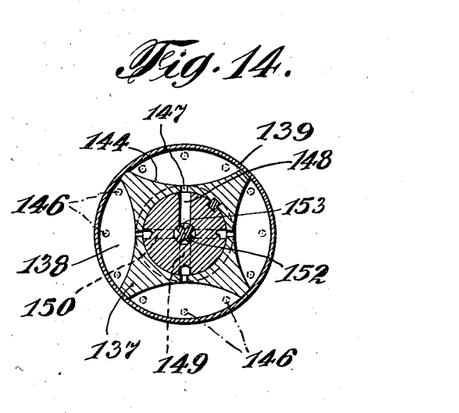
Fig. 14 is a transverse sectional view taken along the line 14—14 of Fig. 13.

In Figs. 13 and 14 is shown a fragmentary view of another construction for effecting the lubrication of a universal joint of the type considered in Figs. 9 to 12. In this embodiment, the speedometer worm sleeve 136 which is secured about the driving shaft 137 is provided with an integral outstanding flange 138 mounting the trough 139 which constitutes a sheet metal annulus extending about the outer periphery of the flange and having an inwardly sloping flange constituting the collecting element of the trough. The lubricant is delivered substantially in the manner heretofore described, through a bore 140 in the stationary collar 141, which encircles the splined sleeve 142 of the driving terminal, and which delivers into a guide shield 143, in turn, dripping to the trough.

In this embodiment, lubricant does not escape from the trough while the construction is in rapid rotation, it being provided that only after the shaft has come to rest or nearly to rest shall the lubricant pass on to the joint. For this purpose, the flange 138 is provided with arcuate flat grooves 144, illustratively four in number, milled into the face thereof, said grooves closed at their open sides by an annular face plate 145, in turn, held in position by the trough blank 139, which is pressed thereover and closes the mouths of the wells. The trough 139 communicates with the wells 144 by way of corresponding apertures 146 through the face plate 145 and at the radially outermost part of the trough. The wells are drained through radial bores 147 through sleeve 136 registering with bores in the shaft 137. The bores in the shaft extend obliquely in different directions, so as to avoid undue weakening of the driving shaft which might result if all of the bores were in one and the same transverse plane. For this purpose, bores 148 and 149 from two diametrically opposite wells extend obliquely in opposite directions, as shown. Bores 150 from the other two wells extend similarly in a plane longitudinally of the shaft and at right angles to that determined by bores 148 and 149. To avoid escape of lubricant entering the upper of the bores from the corresponding well, by gravity downward through one or more of the lower bores instead of forward through the axial bore 151 in the shaft, the latter bore is closed with a plug 152 having corresponding grooves 153 therein, so that, as best shown in Fig. 14, lubricant admitted to one of the grooves will pass therealong rather than to the lower transverse bores of the shaft. The lubricant tending to escape from the end of the shaft 137 is confined against loss by a screw cap 154, threaded into the inner end of terminal sleeve 142. The lubricant is passed onward to the interior of the universal joint enclosure by ducts 155 through the clevis jaws thereof, communicating with axial bores 156 similar to those described in Fig. 9 in the bearing studs thereof, whence the lubricant is spread or divided in the interior of the enclosure in manner apparent from the previous description. The slide joint 157 may be lubricated from the universal joint in the same manner as in Fig. 11.

The stationary collar, as in other embodiments, has reverse-feed oil grooves 158 contacting the splined sleeve 142, so that any lubricant from the transmission case tending to escape thereat will be fed backward to the guide shield 143 and to the trough rather than to escape at the dust-excluding packing 159.

In operation of this embodiment, lubricant supplied through the inlet P drips off the annular guide 143 into the trough 139 and, assuming the device to be in operation while the lubricant is supplied, passes radially outward through the apertures 146 into the arcuate wells 144, in which during rapid rotation, the lubricant remains, being thrown radially outward against the closed outer wall thereof.

Preferably three or more apertures 146 equally spaced, deliver to each of the wells, as best shown in Fig. 14, so that at least one of said apertures will be below the lowermost part of the trough rim, to drain into the corresponding well, any lubricant admitted to the trough while the universal joint is not in revolution. Lubricant will, therefore, not be lost by overflowing from the trough rim.

When the device comes to a stop or is about to stop, the lubricant from the well or wells above the horizontal axis of the shaft will pass by gravity through the corresponding bore 147—148 to the corresponding plug groove 153 in the axial bore and thence lengthwise thereof into the cavity closed by cap 154, from which cavity the lubricant passes outward by centrifugal force after the joint is again in revolution, through bores 155 and into the bearing stud enclosure 100. It is understood, of course, that some or all of the lubricant in the cavity may drain into enclosure 100 by gravity flow while the universal is still stationary, but only if the joint should happen to come to rest with one of the bores 155 sloping downward from the cavity to the enclosure.

Figures 15, 16, 17, 17A, 18, 19:
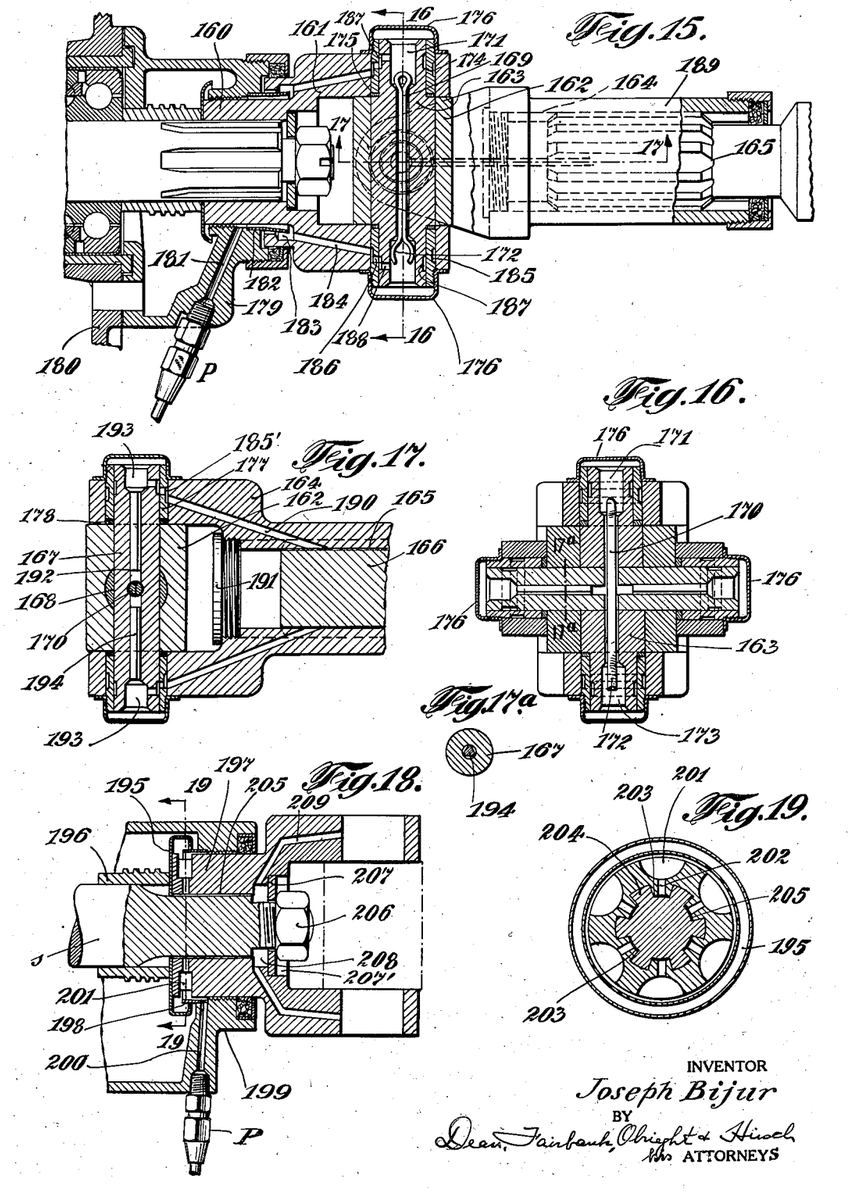

In Figs. 15 to 17 is shown an application of my invention in connection with another type of universal joint. The type here considered comprises a driving forging with a splined sleeve 160 and having integral clevis jaws 161 straddling a rectangular trunnion block 162 through which extends a driving cross pin 163, the ends of which bear in the eyes of the clevis. The driven forging 164 is similar to the driving forging and has a splined slide shaft connection 165 about the driven or propeller shaft 166. The clevis jaws of said driven forging 164 straddle the other sides of the rectangular trunnion block 162, to which they are connected by a driven cross pin 167 of diameter smaller than the driving pin, extending through the trunnion block at right angles to the driving pin and through a corresponding transverse bore 168 in the driving pin. To maintain the driven cross pin against shift with respect to the driving pin, the construction includes a cotter pin 169 extending longitudinally through the driving pin and through a corresponding transverse passage 170 in the driven pin, the head of the cotter pin extending in a well 171 at one end of the pin and the prong end 172 into a similar well 173 at the other end thereof.

The driving cross pin 163 is shown with reduced bearing ends about which are press-fitted appropriate bushings 174, each with an oil-retaining packing gasket 175 at the inner end thereof. Caps 176 threaded upon the outer ends of the bushings and pressed against the clevis maintain the lubricant against outward escape from the wells 171 and 173. The driven pin 167 has similar bushings 177 press-fitted thereover and similarly related, except that the end of the driven pin is not reduced and the gaskets 178 at the inner ends of the bushings are pressed direct against the trunnion block.

For lubricating universal joints of the type described, I provide an arrangement generally similar to that previously set forth, including the stationary collar 179 fixed preferably to the transmission case 180 and about the driving splined hub 160 through a bore 181 in which the inlet fitting P delivers to a sheet metal annular guide sleeve 182 which is secured to the collar, extends about the splined hub and flares outward to drip into an annular trough 183 formed integral with the driving forging and concentric with the driving shaft axis. The trough drains to the universal joint through outwardly extending bores 184 in the clevis jaws 161, each delivering to an annular groove 185 about the corresponding bushing. Lubricant from the groove 185 passes through a radial bore 186 outwardly displaced from the end of the bore 184 and delivers to a peripheral groove 187 about the bearing end of the cross pin, which, in turn, delivers through a radial bore 188 in the cross pin into the corresponding well 171 or 173. Lubricant spreading from the groove 187 lubricates the adjacent bearing surface.

In the present embodiment also, it is desirable to lubricate the slide joint 189 with lubricant derived from the universal joint. For this purpose, each bearing end of the driven cross pin 167 has a groove and duct construction similar to that associated with the driving pin, corresponding parts of said structure bearing the same reference numerals as at the driving pin, primed, however, and the inner end of each bushing groove 185′ is directly connected to the slide bearing surface by a corresponding oblique bore 190 through the driven forging, delivering to the slide shaft 165. To prevent escape of lubricant delivered to the slide shaft from beyond the end of said shaft, the inner end of the driven terminal sleeve 189 is closed by a screw plug 191. Such screw plug, it will be seen is not in this case provided at the driving terminal 160, since the bore 184 connecting the trough 185 to the trunnion bearing is not in communication with the shaft end.

In operation, lubricant delivered to the trough 183 from the inlet P will travel outward by centrifugal force through bores 184 and to the bearings of the driving cross pin. The lubricant spreads from grooves 187 in the bushing-bearing surfaces, while some flows through the bores 188 to enter the wells 171 and 173. Lubricant in the wells may be thrown outward by centrifugal force against the caps 176 and after the device has come to a stop, some will escape from the then uppermost well through the restricted passage determined between the longitudinal bore and the cotter pin 169 to the lower cap 176. At such times as the universal joint happens to come to rest with the driving cross pin approximately horizontal and the driven pin approximately vertical, some of the lubricant from one of the wells of the driving pin will pass along the cotter pin 169 and will enter the longitudinal bore 192 of the driven pin 167 to supply the corresponding wells 193 at the ends of the latter. In the course of time, the lubricant will thus divided substantially uniformly between the four bearing surfaces of the universal joint.

At such times as the driven cross pin assumes substantially vertical position, as shown in Fig. 17, some of the lubricant from the groove 185′ about the bushing 177 then uppermost will pass by gravity flow through one of the oblique bores 190 to supply the slide shaft 165.

To assure adequate lubrication for the slide shaft instead of draining of the then uppermost well 193 of the driven cross pin, through the longitudinal bore 192 thereof, said bore is restricted by plugging with polygonal pins 194 from opposite ends thereof, so that lubricant from the uppermost well will readily flow to the slide bearing and not simply down to the lowermost well.

In Figs. 18 and 19 is shown another modification peculiarly applicable to a universal joint of the type shown in Figs. 15 to 17. This embodiment resembles to some extent that shown in Fig. 13 and above described and includes a sheet metal annular trough member 195 clamped between the speedometer sleeve 196 about the driving shaft *s* and the splined sleeve 197 of the driving terminal. The trough is supplied with lubricant dripping from an annular guide sleeve 198 secured in a stationary collar 199 encircling the splined sleeve and, in turn, supplied through a bore 200 in said collar. The splined sleeve 197 is provided with a plurality of milled arcuate wells 201 therein encircled by the trough 195 and extending therebetween and the splined shaft, said wells delivering through radial bores 202 to the splines of the shaft *s*. The splined teeth 203 on the sleeve are somewhat shallower than the splines 204 on the shaft to provide longitudinal passageways 205 along the splined shaft for any lubricant delivered thereto from the trough 195. The nut 206 which is threaded onto the end of the splined shaft to maintain the universal joint assembled thereto, exerts its pressure against the plate or washer 207, which, in turn, fits into a corresponding pilot opening 207' in the forging and closes the annular cavity 208 into which is delivered the lubricant passing lengthwise of the splines.

In operation, it may be briefly noted that lubricant delivered to trough 195 from the inlet, is retained therein by centrifugal force until the joint has come to rest or substantially to rest, at which time, some of the lubricant in the trough will be intercepted by one or more of the wells 201 then uppermost, and will drop by gravity through the corresponding bore 202, passing lengthwise of the corresponding spline passageway 205 to chamber 208, from which, after the joint is again set into revolution, the lubricant will travel by centrifugal force through bores 209 to the bearings to be lubricated. In this embodiment also, some or all of the lubricant in cavity 208 may drain to the bearings by gravity flow while the universal is still stationary, if the joint should happen to come to rest with one of the ducts 209 sloping downward from the cavity 208. The distribution of lubricant between the bearings of the universal joint is accomplished in substantially the same manner set forth in the description of Figs. 15 to 17.

It will be understood that in all of the embodiments shown in Figs. 8 to 19 inclusive, lubricant may be conveyed lengthwise of the propeller shaft to supply the rear from the forward universal joint in the manner shown with various modifications in Figs. 1 to 6. While in Figs. 8 to 19, I have shown universal joints more especially applicable for the forward end of a propeller shaft, it will be apparent from Figs. 7 and 8, how these constructions can be modified for applicability to the rear universal.

The invention, though it finds its preferred field of application in the relations specifically disclosed, is not limited to such applications but may be employed in the lubrication of universal joints of various types, in other power trains. Certain of the broader features of the invention are, moreover, applicable to the lubrication of bearing or wearing surfaces, more especially of power transmitting instrumentalities other than universal joints.

I claim:—

1. In apparatus of the character described, in combination, a pair of shafts, a universal joint connecting said shafts and including a clevis structure including a sleeve on one of said shafts and exposed at its clevis end, a clevis structure including a sleeve on the other of said shafts, a conduit conveying lubricant length wise of the first sleeve and through the clevis jaw structure to supply the bearings of the universal joint, an inlet for said conduit fixed during operation of the joint, a conduit through the other clevis structure, and means closing the inner end of said latter structure to confine the lubricant in its flow from the second mentioned clevis conduit.

2. The combination set forth in claim 1 in which the lubricant is delivered to the conduit from a trough encircling the shaft and rotating therewith and in which said trough is supplied from said stationary inlet in a fixed collar encircling the same.

3. In apparatus of the character described, in combination, a pair of shafts, a universal joint connecting the same including a sleeve splined to the driving shaft, a projection integral therewith and carrying a pair of bearings of the universal joint, means supplying lubricant to said bearings comprising a trough encircling the driving shaft, ducts delivering from said trough to said bearings and extending through the projection, and a stationary inlet delivering lubricant to said trough.

4. In apparatus including a driving and a driven shaft and an interposed universal joint connecting the same, of the type comprising sleeves splined to the respective shafts and each with a projection having a pair of diametrically opposite lugs, and an annular enclosure carrying bearings for said lugs, transmitting torque therebetween and affording a lubricant-tight enclosure for the bearings; the combination therewith of means for establishing lubricant communication with respect to said universal joint, said means comprising an oil duct through one of the diametrically opposite lugs, communicating with a duct through the corresponding projection and in communication with a part beyond the universal joint.

5. In apparatus including a driving and a driven shaft and an interposed universal joint connecting the same, of the type comprising sleeves splined to the respective shafts and each with a projection having a pair of diametrically opposite lugs, and an annular enclosure carrying bearings for said lugs, transmitting torque therebetween and affording a lubricant-tight enclosure for the bearings; the combination therewith of means for supplying lubricant to said universal joint, said means comprising a stationary collar encircling one of said shafts, a lubricant inlet therein, a trough rotating with said shaft and intercepting lubricant from said inlet, and ducts through the structure of said universal joint, connecting said trough to said lugs and extending axially through said lugs to deliver lubricant into the annular enclosure for supplying the bearings therein.

6. In a universal joint of the type including a driving terminal having a pair of diametrically opposite lugs, a driven terminal having a pair of diametrically opposite lugs and including a splined sleeve for slide connection to the driven shaft, an annular enclosure about said lugs maintaining them at intervals of a quadrant, transmitting torque between them and maintaining the lubricant against escape therefrom, means for supplying the driven splined shaft with lubricant from said enclosure, said means comprising an axial passage through the corresponding lugs, communicating with a passage through the driven terminal and delivering to the splined shaft and a closure affixed in the sleeve of the driven terminal to prevent loss of lubricant delivered to said slide shaft.

Signed at New York city, in the county of New York and State of New York, this 17th day of June, A. D. 1924.

JOSEPH BIJUR.